(12) United States Patent
Sumi et al.

(10) Patent No.: US 8,740,042 B2
(45) Date of Patent: Jun. 3, 2014

(54) FRICTION-WELDED PART AND METHOD OF FRICTION WELDING

(75) Inventors: Shinichiro Sumi, Shizuoka (JP); Kou Mizuguchi, Tokyo (JP); Hiroyuki Mochizuki, Shizuoka (JP); Kazuhiro Nakakura, Niigata (JP)

(73) Assignees: Nippon Light Metal Company, Ltd., Tokyo (JP); Nikkeikin Aluminium Core Technology Company Ltd., Tokyo (JP)

( * ) Notice: Subject to any disclaimer, the term of this patent is extended or adjusted under 35 U.S.C. 154(b) by 1535 days.

(21) Appl. No.: 12/374,264

(22) PCT Filed: Jul. 19, 2006

(86) PCT No.: PCT/JP2006/314216
§ 371 (c)(1),
(2), (4) Date: Oct. 14, 2009

(87) PCT Pub. No.: WO2008/010265
PCT Pub. Date: Jan. 24, 2008

(65) Prior Publication Data
US 2010/0040900 A1 Feb. 18, 2010

(51) Int. Cl.
*B23K 20/12* (2006.01)
*B23K 103/10* (2006.01)
*B60G 7/00* (2006.01)

(52) U.S. Cl.
USPC ............... 228/114.5; 228/112.1; 428/654

(58) Field of Classification Search
USPC ........... 428/654; 228/2.1, 2.3, 112.1, 114.5
See application file for complete search history.

(56) References Cited

U.S. PATENT DOCUMENTS 6,021,938 A * 2/2000 Bock et al. ............... 228/112.1
6,105,849 A * 8/2000 Mochizuki et al. ........ 228/112.1

FOREIGN PATENT DOCUMENTS

| EP | 0 920 948 A2 | 6/1999 |
| JP | 5-96385 A | 4/1993 |
| JP | 10-35235 A | 2/1998 |
| JP | 11-156562 A | 6/1999 |
| JP | 2000-107873 A | 4/2000 |
| JP | 2000-161414 A | 6/2000 |

OTHER PUBLICATIONS

English Machine Translation of JP H05-096385 (Murai et al.).*
English Machine Translation of JP H05-096385 (Murai et al., Apr. 20, 1993).*
Chinese Office Action dated Nov. 30, 2010 with English translation.
International Search Report dated Aug. 22, 2006 with English translation (Four (4) pages).

* cited by examiner

*Primary Examiner* — Gwendolyn Blackwell
*Assistant Examiner* — Lucas Wang
(74) *Attorney, Agent, or Firm* — Crowell & Moring LLP

(57) ABSTRACT

The invention provides a friction-welded part featuring easy design as well as a method of producing said part. The friction-welded part 1 is produced by friction-welding a first member 10 and a second member 20 together. The first member 10 is made of an aluminum alloy material, having a uniform cross-section portion 11 whose cross-sectional shape and size are not changed. The second member 20 is made of an aluminum alloy material, having a uniform cross-section portion 21 whose cross-sectional shape and size are not changed. According to the invention, the uniform cross-section portions 11 and 21 are friction-welded together to form the part 1. A heat affected zone "H" caused by friction welding is formed only in the uniform cross-section portions 11 and 21. The uniform cross-section portion 11 of the first member 10, and the uniform cross-section portion 21 of the second member 20, respectively, have a cylindrical shape, preferably having the same sectional dimension.

8 Claims, 6 Drawing Sheets

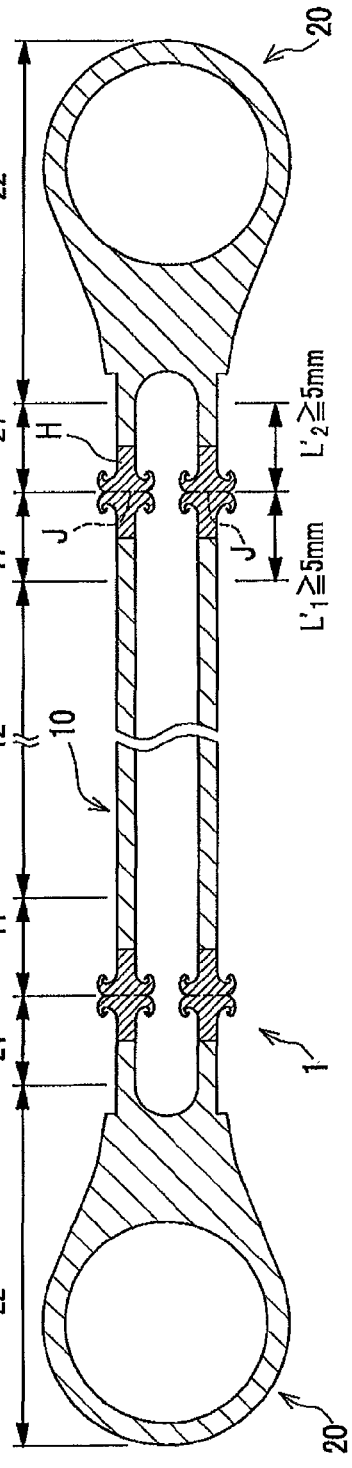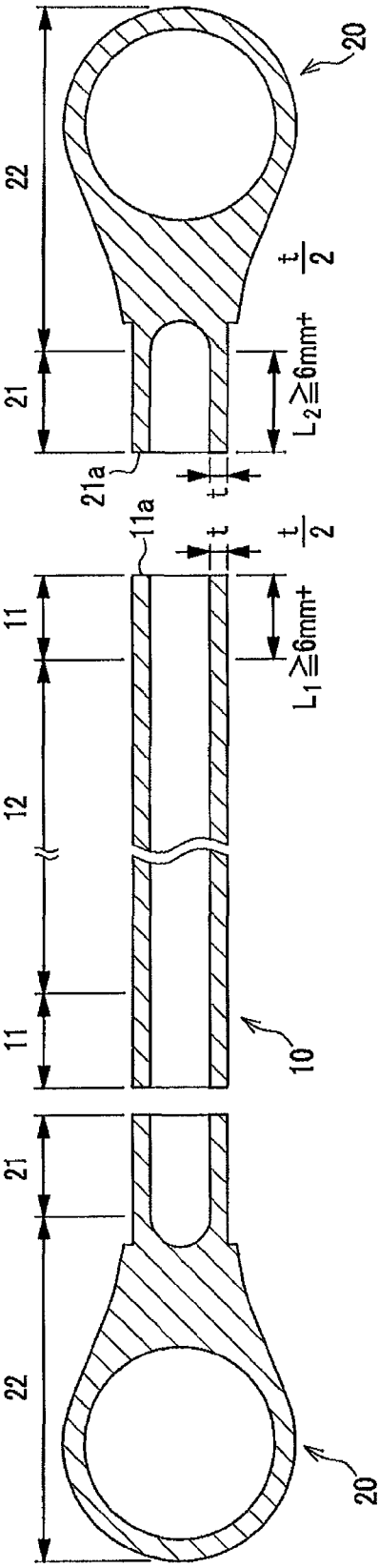

FRICTION-WELDED PART AND METHOD OF FRICTION WELDING

BACKGROUND OF THE INVENTION

1. Field of the Invention

This invention relates to friction-welded parts and a method of friction-welding.

2. Description of Related Art

Conventionally, an iron material is used for cylindrical parts used to constitute a suspension for an automobile, such as an upper link, a lower link, and a radius rod (hereinafter referred to as "suspension part"). However, in order to reduce a vehicle weight, an aluminum alloy material has come to be used more commonly for recent years. For example, Japanese Laid-open Patent Publication No. H11-156562 discloses a suspension part that is formed by friction pressure-welding aluminum-alloy end members onto both sides of an aluminum-alloy pipe-shaped member.

Friction pressure-welding (hereinafter referred to as "friction-welding") is one of solid-state welding methods and enables joining members of various materials with constant quality, since the friction-welding process does not leave any defect which is often caused when the melt welding process is adopted. Moreover, since pressure-welding does not require special skills such as needed for MIG welding and TIG welding, it is of use in various welding fields.

However, because of friction heat generated during friction welding, it is unavoidable to have a heat affected zone (hereinafter referred to as "HAZ") at and in the vicinity of a weld interface. The material of HAZ is metallurgically different in properties inclusive of strength from the base material. If a size of HAZ is enlarged beyond a uniform cross section portion to include a part of a non-uniform cross-section portion (whose cross-sectional shape varies), it becomes difficult and complicated to design a suspension part, since stress concentration can easily occur in the non-uniform cross-section portion. Namely, if the size of HAZ reaches the non-uniform cross-section portion, changes in stress due to variations in cross-sectional shape, as well as changes in strength caused by heat effects must be taken into account, which makes it difficult to design a suspension part.

The above-mentioned problem is not limited to a suspension part formed by friction-welding a pipe-shaped member and an end member together. The same problem is also encountered for a general friction-welded part formed by friction-welding a first member and a second member together.

In order to solve the problem with friction welding, the present invention is to provide friction-welded parts to be designed more easily, as well as a method of friction-welding thereof.

A friction-welded part according to the present invention to solve the above-mentioned problem is produced of a first member made of an aluminum alloy material, having a uniform cross-section portion in which the cross-sectional shape does not vary, and a second member made of an aluminum alloy material, having a uniform cross-section portion in which the cross-sectional shape does not vary. The first member and the second member are then friction-welded together to form a friction-welded part, in which the uniform cross-section portions of the first and the second members are joined together by friction welding, having HAZ generated during friction welding formed only in the uniform cross-section portions. It should be noted that the present invention is used to produce a general friction-welded part, as described above. More specifically, the present invention is best used for the production of suspension parts such as a suspension rod for passenger vehicles.

In other words, excellence of the present invention is specifically attributed to forming the uniform cross-section portions of each of the first and the second members to be joined, as well as providing a means for preventing HAZ generated by friction-welding from being created in any other portion than the uniform cross-section portions. According to the present invention, changes in strength caused by heat effects occur only in the uniform cross-section portion and, therefore, design of both first and second members to be joined can be made easily, even if either first or second member includes a portion where a cross-section may vary (i.e. a non-uniform cross-section portion). Namely, while designing a non-uniform cross-section portion of a friction-welded part, the friction-welded part according to the present invention can eliminate the need for taking into consideration any changes in strength caused by heat effects; thus, facilitating design of the part.

It should be noted that, preferably, if the uniform cross-section portion of the first member, and the uniform cross-section portion of the second member to be joined have cylindrical shapes, respectively, both of the uniform cross-section portions should have the same shape and the same size. When the uniform cross-section portions are joined together by friction-welding, and if shapes of the uniform cross-section portions are cylindrical, oxide films already formed on the end surfaces (or the butting face) in the uniform cross-section portions are easily discharged, accompanied by the creation of burrs. In addition, if both of the uniform cross-section portions have an identical shape, friction heat generated at the weld interface is transferred uniformly into the respective uniform cross-section portions, causing a strength distribution to be symmetric with respect to the weld interface. This means that it is much easier to design the welding metal members. Furthermore, the present invention can help to easily produce burrs of bilaterally symmetrical shape made as a result of friction-welding and to determine a desirable condition of friction welding in order to have an effective area of a joint portion friction-welded.

The inventors have discovered that there is no influence on a non-uniform cross-section portion if the following conditions are met. (a) both the uniform cross-section portion of the first member and the uniform cross-section portion of the second member have cylindrical shapes; (b) the uniform cross-section portions of the first and the second members have the same sectional dimension; and (c) the lengths of the uniform cross-section portions are kept 5 mm or longer, respectively, after the friction-welding process. Namely, given a friction-welded part having a uniform cross-section portion whose length is 5 mm or longer after friction-welded, any change in strength which might be caused by heat effects during the friction-welding process is not required to be considered when designing a non-uniform cross-section portion. This makes it much easier to design the non-uniform cross-section portion.

More specifically, it proves that if the uniform cross-section portion is in a cylindrical shape, has a pipe-wall thickness "t" ranging from 2 to 5 mm, and is kept 5 mm long or more after friction-welded, it is guaranteed that HAZ generated by a friction-welding process is restricted within the uniform cross-section portions.

It should be noted that if the lengths of the uniform cross-section portions before friction-welded are (6 mm+t/2) or more, respectively, the lengths of the uniform cross-section portions after friction-welded should be kept 5 mm long or more by shortening each length of the uniform cross-section portion at least by (t/2) through the friction-welding process. When performing friction-welding according to the present invention, HAZ generated by the friction-welding process can be restricted within the uniform cross-section portions. In addition, oxide films already formed on the end surfaces of the uniform cross-section portions are removed from the weld interface. As a result, no variation in joint strength can be observed.

The present invention requires no confinement regarding conformations of the first member and the second member. However, if a friction-welded part of the present invention is applied to a suspension part such as a suspension rod, a pipe-shaped extruded material can be used for the first member and an end member formed of an extrusion material can be used for the second member. Preferably, the uniform cross-section portion of the second member should have a cylindrical shape, and a length thereof should be as long as or shorter than the outer diameter of the uniform cross-section portion, before friction-welded. It should be noted that the uniform cross-section portion of the second member can be formed by cutting and drilling work on a portion of the extrusion material. By setting the length of the uniform cross-section portion of the second member before friction-welded to be equal to or less than the outer diameter of the uniform cross-section portion, it can limit an increase in time and cost required for cutting and drilling work. In addition, if performed likewise, the volume of aluminum alloy removed for cutting and drilling can be minimized, preventing the used material from being unnecessarily wasted. In other words, if the length of the uniform cross-section portion of the second member before friction-welded is greater than the outer diameter of the uniform cross-section portion, it can increase time and cost required for cutting and drilling work. In addition, the volume of aluminum alloy removed for cutting and drilling can also increase, resulting in increase in the wasted material.

SUMMARY OF THE INVENTION

The present invention to solve the above-mentioned problem provides a method of friction welding wherein to use the followings: a first member made of an aluminum alloy material, having a uniform cross-section portion in a cylindrical shape with a pipe-wall thickness "t" in the range of between 2 and 5 mm (inclusive), and with a length equal to or greater than (6 mm+t/2); a second member made of an aluminum alloy material, having a uniform cross-section portion in a cylindrical shape with the same shape and size as those of the uniform cross-section portion of the first member, and the length of the uniform cross-section portion in the second member being equal to or greater than (6 mm+t/2).

The method of friction welding according to the present invention comprises the steps of: providing a friction process of butting the uniform cross-section portions of the first and the second members together, while rotating the first and the second members relatively to one another to apply a friction pressure; providing an upset process of applying an upset pressure greater than the friction pressure within 0.5 seconds from the time when the relative rotation starts to stop; and providing specifications stipulating that a total upset length is equal to or more than the pipe-wall thickness "t", and that the respective lengths of the uniform cross-section portions after friction welded are equal to or more than 5 mm.

The above-mentioned friction welding allows that the HAZ caused by a friction-welding process is formed only in the uniform cross-section portions, and that oxide films already formed on the end surfaces of the uniform cross-section portions can be removed from the weld interface, resulting in a favorable joint strength with no variation.

The present invention requires no confinement regarding conformations of the first member and the second member. Note, however, that if a friction-welded part is to be used for a suspension part including a suspension rod, a pipe-shaped extrusion material can be used for the first member, while an end member formed by using an extrusion material can be used for the second member. Preferably, the uniform cross-section portion of the second member should have a cylindrical shape, and the length of the uniform cross-section portion before friction welded should be equal to or less than the outer diameter of the uniform cross-section portion. It should be noted that the uniform cross-section portion of the second member can be produced by performing cutting and drilling work on a portion of the aluminum extrusion material. By setting the length of the uniform cross-section portion of the second member before friction welded to be equal to or less than the outer diameter of the uniform cross-section portion, it can limit an increase in time and cost required for cutting and drilling work. In addition, if performed likewise, the volume of aluminum alloy removed as shavings can be minimized, avoiding materials from running to waste.

According to a friction-welded part of the present invention, it becomes much easier to design a part. In addition, according to a method of friction-welding provided by the present invention, it is possible to obtain a friction-welding part which is much easier to design.

BRIEF DESCRIPTION OF THE DRAWINGS

FIG. 1A is a cross-sectional view illustrating a friction-welded part according to an embodiment of the present invention. FIG. 1B is a cross-sectional view illustrating a first member and a second member before friction welded.

DETAILED DESCRIPTION OF THE INVENTION

Figure 2A:
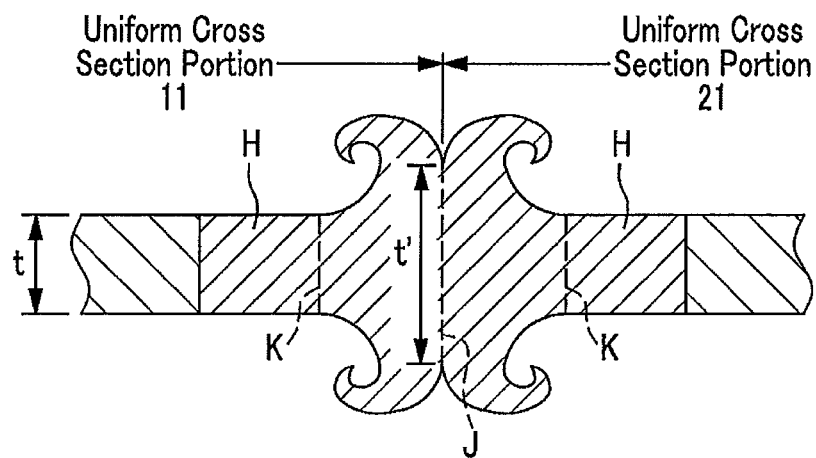
FIG. 2A is an enlarged cross-sectional view illustrating the vicinity of a friction-welded portion.

The present invention now will be described more fully hereinafter with reference to the accompanying drawings, in which preferred embodiments of the invention are shown. A friction-welded part described in the following embodiments, is to be used for a suspension rod, a type of a suspension part. Note, however, that the embodiments described in the following are to be considered in all respects as illustrative and not restrictive on applications of a friction-welded part according to the present invention.

As shown in FIG. 1A, the friction-welded part 1 according to an embodiment is formed of a first member 10 in a pipe shape, both ends of which are joined by friction-welding with second members 20, 20 used as end members. A HAZ "H" is formed respectively in a portion around a weld interface "J" between the first member 10 and the second member 20.

As shown in FIG. 1B, the first member 10 is made of an aluminum alloy-made extrusion material in a circular-tube shape and has a main portion 12 and uniform cross-section portions 11, 11 which are respectively formed on both ends of the main portion 12.

The uniform cross-section portion 11 before friction-welded is in a cylindrical shape with a uniform cross-section shape in the direction of extrusion. Preferably, a pipe-wall thickness "t" of the uniform cross-section portion 11 should be from 2 to 5 mm, while a length $L_1$ of the uniform cross-section portion 11 before friction-welded should be equal to or more than (6 mm+t/2). In addition, it is preferable that the outer diameter of the uniform cross-section portion 11 should be between 20 and 28 mm (inclusive), which is the best size used for a suspension part such as a suspension rod for a passenger vehicle. Furthermore, as shown in FIG. 1A as well as FIG. 2A, it is preferable that the pipe-wall thickness "t'" after friction welded at and in the vicinity of the weld interface "J" should be 1.4 times or more of the pipe-wall thickness "t" before friction-welded. Similarly, it is preferable that a length $L_1'$ of the uniform cross-section portion 11 after friction-welded should be 5 mm or longer. It should be noted that, according to an embodiment, the main portion 12 also has a cylindrical shape with a uniform cross section shape in the direction of extrusion, and the cross section shape thereof is the same as that of the uniform cross-section portion 11.

Each of the second members 20, 20 is formed of an aluminum alloy-made extrusion material and consists of a uniform cross-section portion 21 and a non-uniform cross-section portion 22. Since primary constituent portions of the second members 20, 20 are identical with each other, the following descriptions are given of only one member of the second members 20 (illustrated at the right side in FIG. 1) with detailed descriptions for the other member omitted.

As shown in FIG. 1B, the uniform cross-section portion 21 before friction-welded is in a cylindrical shape with a uniform cross section shape, which is the same cross-sectional shape as that of the uniform cross-section portion 11 of the first member 10. Preferably, the length $L_2$ of the uniform cross-section portion 21 before friction-welded should be equal to or more than (6 mm+t/2), and be equal to or less than the outer diameter. Furthermore, as shown in FIG. 2A, it is preferable that the pipe-wall thickness "t'" of the weld interface "J" after friction-welded at and in the vicinity of the uniform cross-section portion 21 should be 1.4 times or more of the pipe-wall thickness "t" before friction-welded. Accordingly, it is preferable that the length $L_2'$ of the uniform cross-section portion 21 after friction welded is 5 mm or longer. It should be noted that, even if a cross-sectional shape (in terms of the pipe-wall thickness, the outer diameter and the inside pipe diameter) of the uniform cross-section portion 21 before friction welded is different from that of the uniform cross-section portion 11 of the first member 10, it is preferable that the pipe-wall thickness "t" of the uniform cross-section portion 21 before friction welded should range from 2 to 5 mm. Likewise, it is preferable that the pipe-wall thickness "t'" of the uniform cross-section portion 21 after friction welded at and in the vicinity of the weld interface "J" should be 1.4 times or more of the pipe-wall thickness "t" before friction welded.

Figure 6A:
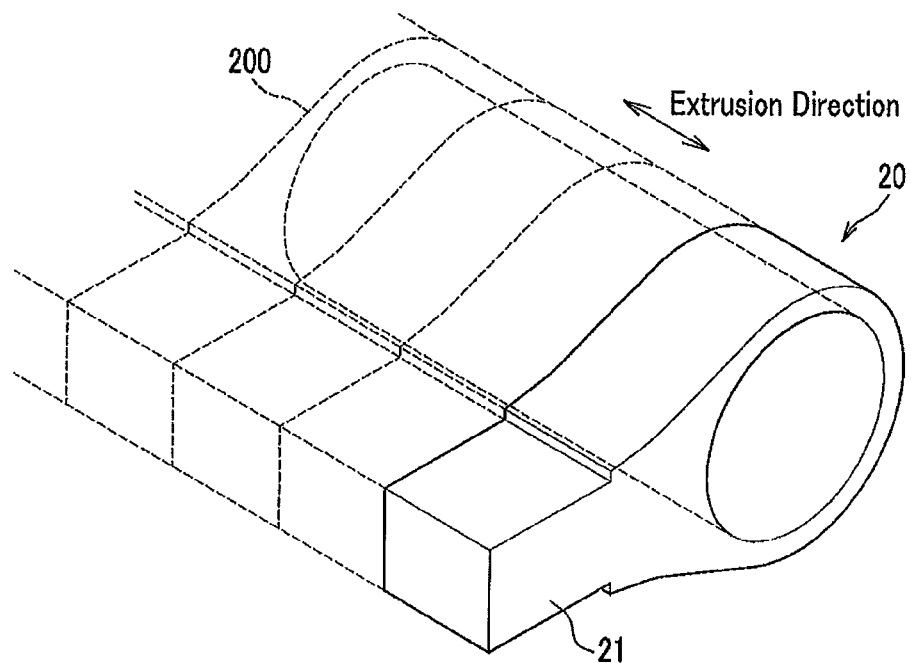
FIG. 6A to FIG. 6C illustrate a procedure for forming a second member.
Figure 6B:
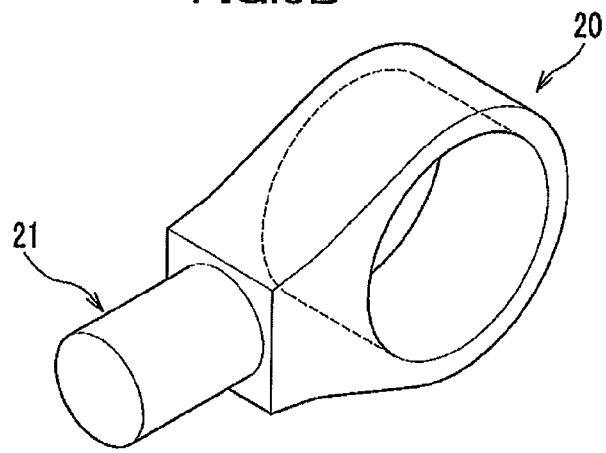
Figure 6C:
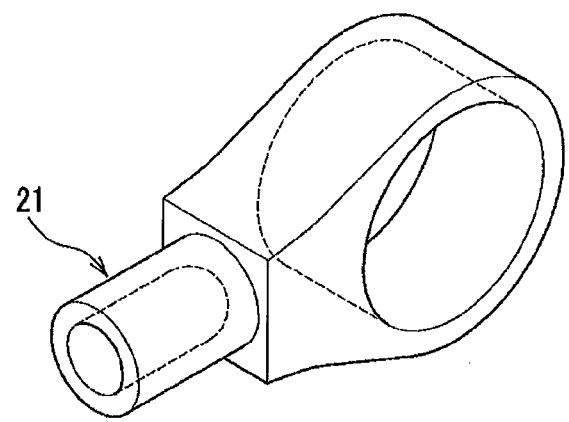

As shown in FIG. 6A, the second member (or end member) 20 is made of an aluminum alloy-made extrusion material 200 which is manufactured through extrusion in the longitudinal direction. The extrusion material 200 is then cut down into pieces of a predetermined size and formed by further work to produce the second members 20. Immediately after cutting the aluminum alloy-made extrusion material 200, the uniform cross-section portion 21 of the second member 20 has a prismatic bar shape. Thus, as shown in FIG. 6B, the uniform cross-section portion 21 is cut into a column. Thereafter the column-shaped uniform cross-section portion 21 is drilled to form a bottomed cylindrical shape, as shown in FIG. 6C. It is noted that the order of cutting and drilling work is interchangeable. Thus, it is allowed that the uniform cross-section portion 21 is first drilled and then cut out.

HAZ is a metallurgically transformed portion having undergone an additional heat treatment due to the friction heat, whose properties inclusive of strength are different from those of the base material. For example, in the case of friction welding using an aluminum alloy material of JIS standard 6000 series (i.e. Al—Mg—Si alloy), the temperature at the weld interface can be raised to as high as 300 degrees or higher and the strength of a portion at and in the vicinity of the weld interface becomes lower than that of the base material and below a predetermined critical strength. This portion thus regarded as HAZ indicated by "H" is created only within the uniform cross-section portions 11 and 21, and the size of HAZ is not enlarged so much as to include a portion of a non-uniform cross-section portion 22. As for the strength in HAZ indicated by "H" when using the first member 10 and the second member 20 made of a heat-treatment alloy material, including JIS standard 2000 series aluminum alloy (i.e. Al—Cu—Mg alloy), JIS standard 6000 series aluminum alloy (i.e. Al—Mg—Si alloy), and JIS standard 7000 series aluminum alloy (i.e. Al—Zn—Mg alloy), the strength becomes lower than that of the respective base material. To the contrary, as for the first member 10 and the second member 20 made of a non-heat treatment alloy material, such as JIS standard 1000 series aluminum alloy (i.e. pure aluminum series materials), JIS standard 3000 series aluminum alloy (i.e. Al—Mn alloy), and JIS standard 5000 series aluminum alloy (i.e. Al—Mg alloy), the strength in HAZ indicated by "H" becomes higher than that of the respective base material.

The weld interface "J" is a butting surface of the uniform cross-section portions 11 and 21. The area of the weld interface "J" is 1.4 times or more of the area of the end surface 11a (or 21a) in the uniform cross-section portion 11 (or 21) before friction welded. If the area of the end surface 11a is different from that of the end surface 21a, the area of the weld interface should be assumed to be 1.4 times or more of the smaller area of the end surface 11a and 21a.

The present invention does not require any specific type of an aluminum alloy material to be used. However, when using the friction-welded part 1 as a suspension part, it is preferable to adopt an Al—Mg—Si alloy material having undergone T6 treatment (i.e. a JIS standard 6000 series aluminum alloy material including quenching after solution treatment and subsequent artificial ageing). Especially, using an Al—Mg—Si alloy material with the T6 treatment (i.e. JIS standard aluminum alloy 6061-T6) is especially preferable because the resultant strength is relatively high (245 MPa or higher for the 0.2% yield load) and durability (including resistance to stress corrosion cracking and resistance to weather) is excellent.

Figure 2B:
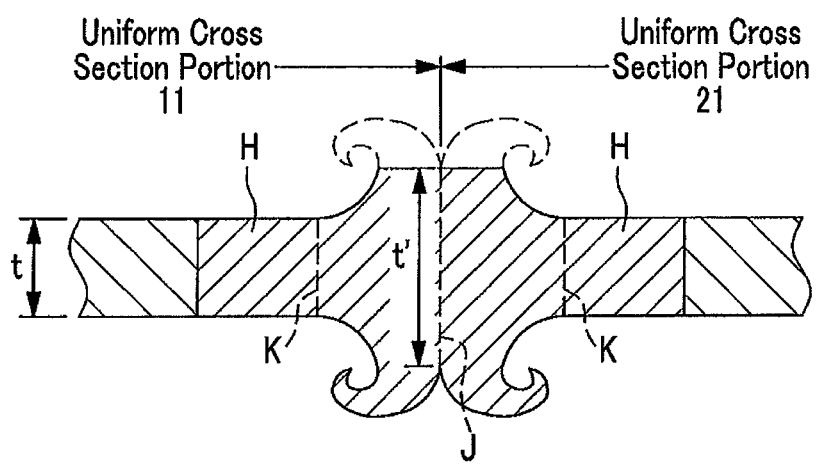
FIG. 2B is an enlarged cross-sectional view illustrating the vicinity of a friction-welded portion after removing burr generated during a friction-welding process.
Figure 3:
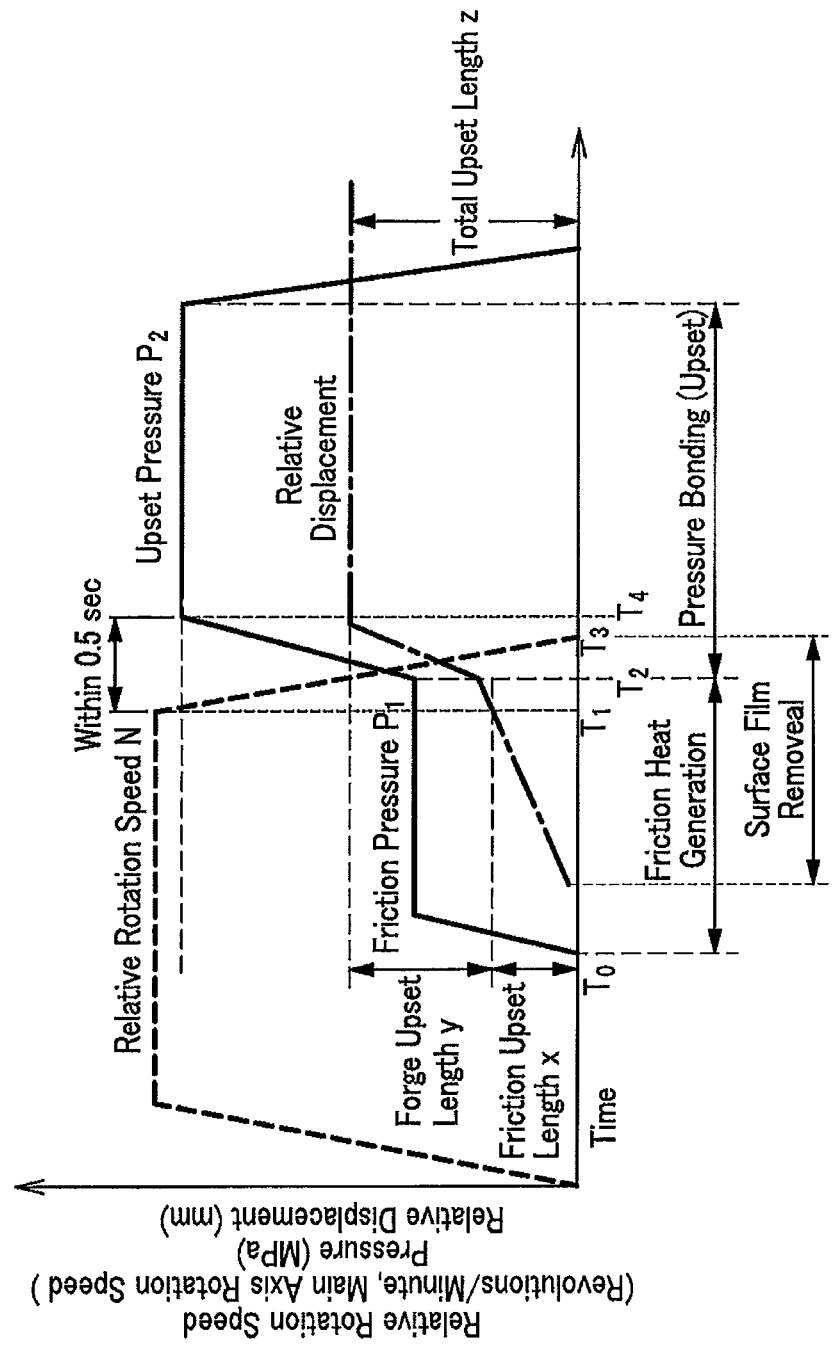
FIG. 3 illustrates a timing chart describing means for friction welding according to an embodiment of the present invention.

The following describes in detail the method of friction-welding the first member 10 with the second member 20 (namely, a method of manufacturing a friction-welded part 1), with reference to FIG. 1 to FIG. 3. It should be noted that the friction upset length "x", the forge upset length 'y', and the total upset length "z", as described later, are used on the assumption that only a single weld joint portion is formed during a single manufacturing process (namely, in the case where one second member 20 is friction-welded to one first member 10). Therefore, when a couple of the second members 20, 20 are friction-welded at the same time to one first member 10, (namely, in the case where two weld joint portions are formed during a single manufacturing process), the friction upset length "x'", the forge upset length "y'", and the total upset length "z'" should become "2x", "2y" and "2z", respectively.

The method of friction welding according to this embodiment comprises a preparatory process, a friction process, and an upset process.

During the preparation process, a clamp on a friction-welding apparatus, which is not illustrated in the drawings, is used to clamp the first member 10. Also, a chuck of a principal axis from the friction-welding apparatus, which is not illustrated in the drawings, is used to grasp the second member 20 so that the central axis of the uniform cross-section portion 21 in the second member 20 is coaxially arranged with the central axis of the uniform cross-section portion 11 in the first member 10.

During the friction process, the second member 20 is made to be approaching the first member 10, while the first and the second members 10 and 20 are being rotated relative to each other. The end surface 11a of the uniform cross-section portion 11 in the first member 10 (referring to FIG. 1B) is then made butted onto the end surface 21a in the uniform cross-section portion 21 of the second member 20 (referring to FIG. 1B). Thereby the friction pressure $P_1$ is applied to the butting surface (namely, the surface between the end surface 11a of the uniform cross-section portion 11 and the end surface 21a of the uniform cross-section portion 21). When applying the friction pressure to the butting surface while rotating the uniform cross-section portions 11 and 21 relative to each other, friction heat is generated on the butting surface. Thereby softened portions in the vicinity of the butting surface are created, in which the material becomes softer than the base material. As the softened portions have high flowability, the material in the softened portions is pushed from within the uniform cross-section portions 11 and 21 to form burrs. As a result the pipe-wall thickness in the vicinity of the weld interface "J" (referring to FIG. 2A) increases. It should be noted that any oxide films and any adhering substance already formed on the end surfaces 11a and 21a in the uniform cross-section portions 11 and 21 before friction welded are removed together with the burrs.

As shown in FIG. 3 in which $T_0$ denotes the time when the first member 10 is butted onto the second member 20 while $T_1$ denotes the time when the relative displacement (amount of the forward movement of the principal axis) increases to the friction upset length "x" from the time $T_0$, the relative rotation speed (revolutions of the principal axis per minute) is kept constant until time $T_1$. Thereafter the relative rotation speed starts to decrease. The friction pressure $P_1$ should be kept constant at least during a period when the relative rotation speed "N" is kept constant after butting the first member 10 onto the second member 20. It should be noted that, according to this embodiment, the friction pressure $P_1$ is continuously applied to the butting surface until time $T_2$, even after the relative rotation starts to decrease (i.e. after the relative displacement reaches the friction upset length "x").

The smaller the rotation speed of the principal axis is (i.e. the relative rotation speed between the first member 10 and the second member 20) and the smaller the friction pressure $P_1$ is (i.e. if the friction upset speed is slower), the longer the time required for the temperature at the butting surface to rise up to the temperature needed for friction welding is. However if a longer time is taken to raise the temperature at the butting surface, more friction heat is dissipated from the butting surface into the base material. Therefore the portion of the friction heat to be used for friction welding decreases and the size of HAZ "H" can be enlarged. Taking account of the above mentioned condition, it is preferable to set the rotational speed of the principal axis to be equal to or more than 1,000 revolutions per minute and to set a friction pressure $P_1$ to be equal to or more than 15 MPa. If the friction pressure $P_1$ exceeds 40 MPa, it might wrench off the uniform cross-section portions 11, 21 and the like, because of a strong rotative force. Thus, it is preferable that the friction pressure $P_1$ is set equal to or less than 40 MPa. It should be noted that under the condition according to this embodiment, in which the pipe-wall thickness of the uniform cross-section portion 11 in the first member 10 as well as the pipe-wall thickness of the uniform cross-section portion 21 in the second member 20 are in the range between 2 and 5 mm (inclusive), the rotational speed of the principal axis should be set around 1,800 revolutions per minute and a friction pressure $P_1$ should be set around 30 MPa. This condition enables the temperature distribution on the butting surface to become stable after the temperature at the butting surface has risen by friction heat, and the size of HAZ "H" to become small.

The friction upset speed during the friction process is determined by the relative rotation speed "N" and the friction pressure $P_1$. If the relative rotation speed "N" is set equal to or more than 1,000 revolutions per minute and the friction pressure $P_1$ is set in the range between 15 and 40 MPa (inclusive), the friction upset speed is in the range from 2.5 to 8.0 mm/sec.

The friction upset length "x" is preferably set equal to or larger than the pipe-wall thickness "t" of the uniform cross-section portions 11 and 21. If the friction upset length "x" is less than the pipe-wall thickness "t", oxide films and any adhering substance already formed on the end surfaces 11a and 21a in the uniform cross-section portions 11 and 21 (referring to FIG. 1B) may not fully be removed by the time when the friction-welding process is completed. If oxide films and the like are left at the weld interface "J", a sufficient tensile strength may not be as high as required. If the friction upset length "x" exceeds twice the pipe-wall thickness (=2t), an amount of heat generated by friction becomes so large that heat input to the first member 10 as well as the second member 20 is too much, and it causes the material to be softened and generate larger burrs than required, which results in enlarging the size of HAZ "H". It should be noted that under the condition according to this embodiment, in which the pipe-wall thickness "t" in the uniform cross-section portion 11 of the first member 10 as well as the pipe-wall thickness "t" in the uniform cross-section portion 21 of the second member 20 are both in the range between 2 and 5 mm (inclusive), the friction upset length "x" should be set approximately 1.5 times the pipe-wall thickness "t".

The upset process refers to a process in which an upset pressure $P_2$ is applied. According to this embodiment, the pressure applied to the butting surface starts increasing up to the upset pressure $P_2$ from the time $T_2$ between $T_1$ and $T_3$, where $T_1$ denotes the time when the speed of the relative rotation starts to decrease (i.e. when the friction upset length becomes "x") and $T_3$ denotes the time when the relative rotation is completely stopped. When the applied pressure reaches the upset pressure $P_2$, it is kept for a predetermined period in order to friction-weld the uniform cross-section portions 11 and 21 together. It should be noted that a material having higher thermal conductivity, such as an aluminum alloy, can easily lower the temperature of a metal member, compared to a steel alloy material. If a period from time $T_1$ to start stopping the relative rotation to the time when pressure reaches the upset pressure $P_2$ (namely, a period equal to "$T_4$−$T_1$") is too long, contraction due to the rapid decrease in temperature can create a joint gap at the weld joint portion, into which air can come to form oxide films. In order to prevent this joint gap from being created, it is preferable to apply the predetermined upset pressure $P_2$ within 0.5 seconds after the time $T_1$ when the relative rotation between the first member 10 and the second member 20 starts decreasing to stop.

Further to the above-mentioned friction process, since the softened portion is generated during the friction process, the applied upset pressure $P_2$ can discharge the material in the softened portion out of the uniform cross-section portions 11 and 21, thereby forming the weld interface "J" without having oxide films and the like. Since the softened portion is discharged out of the uniform cross-section portions 11 and 21, the area of the weld interface "J" can be increased to 1.4 times or more, compared to the respective areas of the end surfaces 11a and 21a in the uniform cross-section portions 11 and 21 before friction welded.

It is necessary that the upset pressure $P_2$ is greater than the friction pressure $P_1$. However, if the upset pressure $P_2$ is set less than 50 MPa, heat contraction due to a decrease in temperature can cause a joint gap at the weld interface, into which air comes to form oxide films. It should also be noted that if the upset pressure $P_2$ exceeds 200 MPa, it requires not only a large-sized friction-welding apparatus, but also may generate buckling or transformation of the base material. Therefore, it is preferable to set the upset pressure $P_2$ to be between equal to or more than 50 Mpa and equal to or less than 200 MPa. More specifically, under the condition according to this embodiment, wherein the pipe-wall thickness "t" of the uniform cross-section portion 11 in the first member 10 as well as the pipe-wall thickness "t" of the uniform cross-section portion 21 in the second member 20 are both in the range between 2 and 5 mm (inclusive), if the upset pressure $P_2$ is set approximately 110 MPa, any oxide films and the like can be completely eliminated, making it possible to form a weld joint portion having high tensile strength.

If the friction upset length "x" is less than the pipe-wall thickness "t", it is necessary to increase the upset pressure $P_2$ so as to increase the forge upset length "y"; this can help the total upset length "z" become equal to or more than the pipe-wall thickness "t", since the total upset length "z" is a sum of the friction upset length "x" and the forge upset length "y". In other words, when the friction upset length "x" is set less than the pipe-wall thickness "t", it is preferable to set the forge upset length "y" to be equal to or larger than the value of (t−x) so that the total upset length z (=x+y) can be equal to or larger than the pipe-wall thickness "t" of the uniform cross-section portions 11 and 21. It is also preferable to decrease the respective lengths of the uniform cross-section portions 11 and 21 by the value of t/2 or more. If the total upset length "z" is set less than the pipe-wall thickness "t" of the uniform cross-section portions 11 and 21, oxide films and the like which have already been formed on the end surfaces 11a and 21a in the uniform cross-section portions 11 and 21 may be left at the weld interface "J". The inventors have discovered that the size of the HAZ "H" is hardly enlarged to the non-uniform cross-section 22, provided that each length of the uniform cross-section portions 11 and 21 is kept equal to or longer than 5 mm after friction welded, if both the uniform cross-section portion 11 of the first member 10 and the uniform cross-section portion 21 of the second member 20 are in a cylindrical shape and if there is no difference in the cross section shape and size between the uniform cross-section portions. Therefore, it is preferable that the total upset length "z" is set so that the lengths of the uniform cross-section portions 11 and 21 after friction welded can be kept equal to or longer than 5 mm.

As shown in FIG. 2B, burrs formed on the outer peripheral of the weld joint portion can be removed to make the surface of the weld joint portion smooth and flat, if required, after the termination of the upset process. It should be noted that, even after the removal of burrs, the area of the weld interface "J" is preferably 1.4 times or more of the area of the end surface 11a or 21a in the uniform cross-section portion 11 or 21 before friction welded.

As for the friction-welded part 1 obtained by performing the above mentioned friction-welding method, the HAZ "H" is formed only in the uniform cross-section portions 11 and 21, since the lengths of the uniform cross-section portions 11 and 21 after friction welded are kept equal to or longer than 5 mm. In other words, the size of the HAZ "H" does not extend to any other portion than the uniform cross-section portions 11 and 21. According to the friction-welded part 1 obtained by performing the above-mentioned friction-welding process, the decrease in strength caused by heat effects occurs only in the uniform cross-section portions 11 and 21. In short, the friction-welded part 1 to be produced according to this embodiment can eliminate the need to consider any change in strength caused by heat effects when designing the non-uniform cross-section portion 22, which makes it much easier to design the region 22. Note that if at least one of the lengths in the uniform cross-section portions 11 and 21 after friction welded is less than 5 mm, portions to be softened by friction heat are not identical between the portions in the uniform cross-section portions 11 and 21, resulting in a difference in the volume of the burr to come out of the uniform cross-section portions 11 and 21.

Figure 4A:
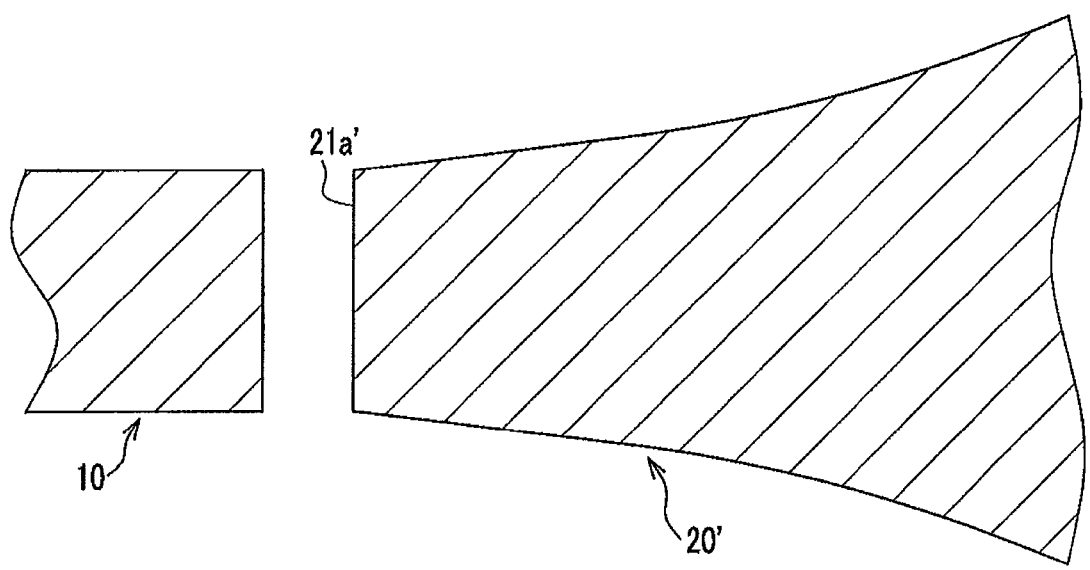
FIG. 4A is a cross-sectional view illustrating a first member having a uniform cross-section portion, as well as a second member without having a uniform cross-section portion.
Figure 4B:
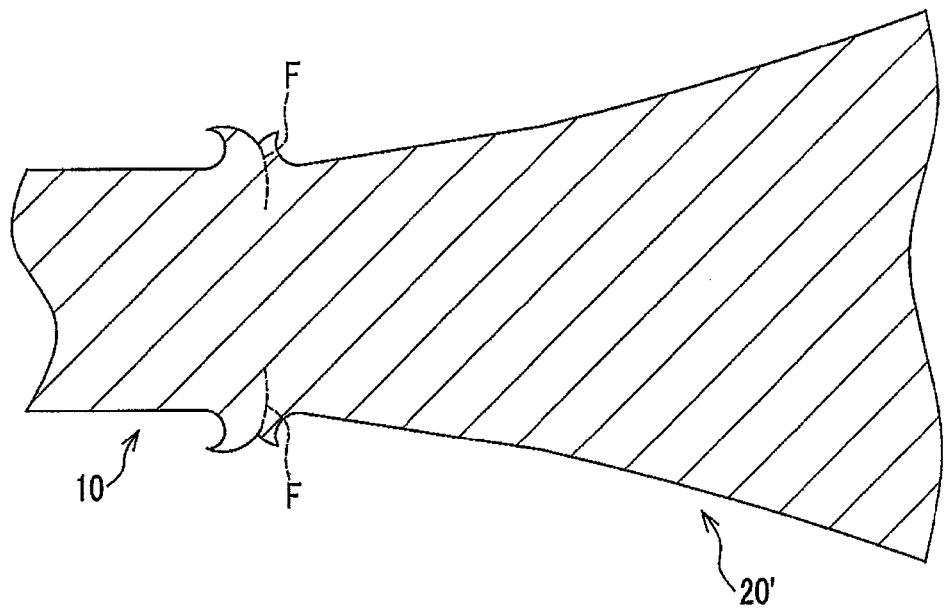
FIG. 4B is a cross-sectional view illustrating the first member and the second member, as shown in FIG. 4A, joined together by friction welding.

As shown in FIG. 4A which illustrates only a single side of the weld joint portion to be formed in a cylindrical shape, if the first member 10 having the uniform cross-section portion 11 is friction-welded with the second member 20' whose cross-section area in the vicinity of the end surface 21a' increases gradually (i.e. the second member 20' without having the uniform cross-section portion), a lot of friction heat can be transmitted (due to heat dissipation) to the side of the second member 20'. Therefore, as shown in FIG. 4B, a volume of the discharged burr formed on the side of the second member 20' is smaller than that of the discharged burr formed on the side of the first member 10. In some cases, oxide films "F" might be left at the weld interface, which can lower the efficiency of producing a welded joint. Oxide films can be removed by increasing the volume of the discharged burr formed on the side of the second member 20', which can also increase the volume of the discharged burr formed on the side of the first member 10, resulting in a poor process yield. On the contrary, according to this embodiment requiring the second member 20 to have the uniform cross-section portion 21, the volume of the discharged burr formed on the side of the second member 20 is the same as that of the discharged burr formed on the side of the first member 10, as shown in FIG. 1A. This can prevent any oxide films from being left at the weld interface "J" and can produce an appropriate amount of burr to be discharged, resulting in a favorable process yield.

According to this embodiment, the uniform cross-section portions 11 and 21, each having the constant cross-sectional area, are created in the first member 10 and the second member 20, respectively. Therefore, the burr discharged from the first member 10 has the same shape as the burr discharged from the second member 20 during friction-welding of the uniform cross-section portions 11 and 21. Any oxide films and the like already formed on the end surfaces 11a and 21a in the uniform cross-section portions 11 and 21, respectively, are included in the burr being created and easily discharged. Since the uniform cross-section portions 11 and 21 should have the same shape and the same size, friction heat generated on the butting surface can be uniformly conducted (or diffused) to the uniform cross-section portions 11 and 21, which makes a strength distribution symmetric with respect to the weld interface; it, thus, makes much easier to design the members. Furthermore, according to this embodiment, it makes easier to generate burrs having a bilaterally symmetric shape, thereby easily determining a condition for friction welding which can produce the effective area of the weld joint portion.

Figure 5A:
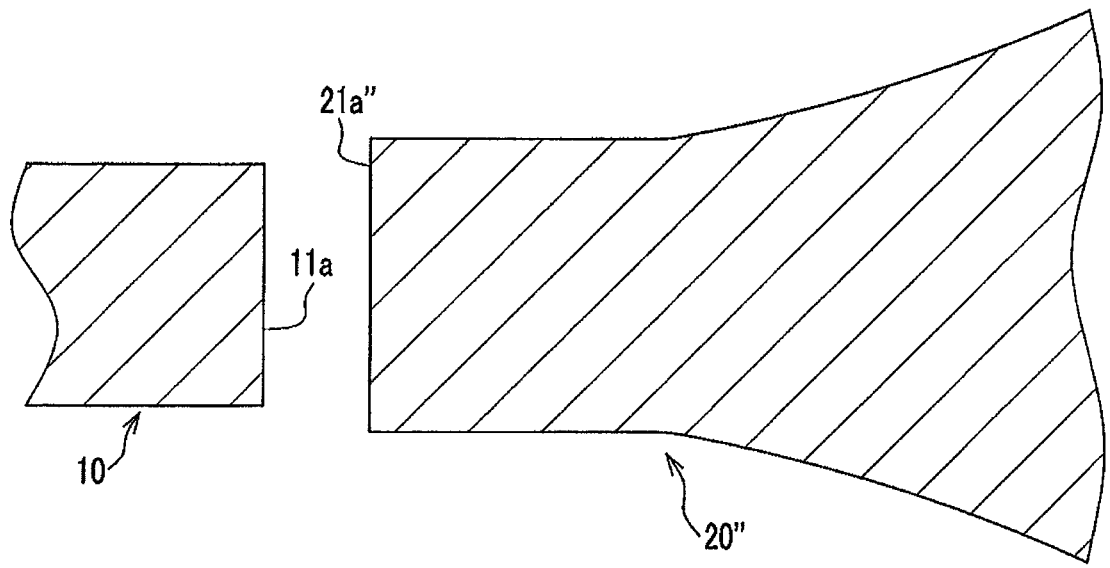
FIG. 5A is a cross-sectional view illustrating a first member having a uniform cross-section portion, as well as a second member without having a uniform cross-section portion.
Figure 5B:
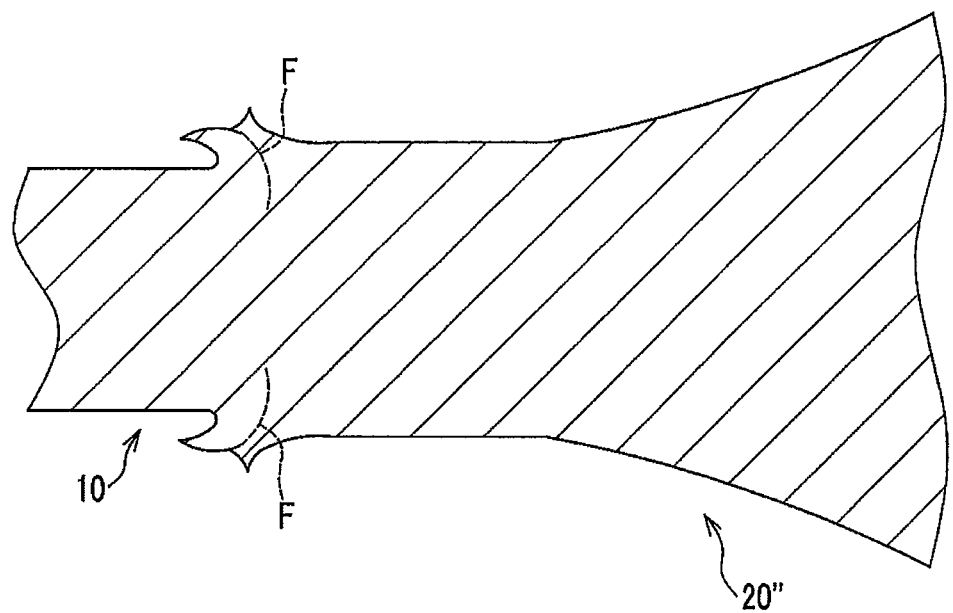
FIG. 5B is a cross-sectional view illustrating the first member and the second member, as shown in FIG. 5A, joined together by friction welding.

As shown in FIG. 5A, if the cross-sectional area of the end surface 21a" in the uniform cross-section portion 21" is greater than that of the end surface 11a in the uniform cross-section portion 11, more friction heat is transmitted (or dissipated) to the side of the second member 20". As a result, the volume of the discharged burr formed on the side of the second member 20" is thus smaller than that of the discharged burr formed on the side of the first member 10, which could lead to an oxide film "F" being left at the weld interface. In other words, it might be possible to reduce the efficiency of producing a welded joint. Oxide films can be removed by increasing the volume of the discharged burr formed on the side of the second member 20", which can also increase the volume of the discharged burr formed on the side of the first member 10, which results in a poor process yield. On the contrary, according to this embodiment requiring both of the uniform cross-section portions 11 and 21 to have the same shape and the same size, the volume of the discharged burr formed on the side of the second member 20 is the same as that of burr to be discharged on the side of the first member 10, as shown in FIG. 1A. Oxide films are thus hardly left at the weld interface "J", which makes it possible to produce an appropriate volume of the discharged burr. Therefore this embodiment can provide a favorable process yield.

When a heat-treatment type aluminum alloy is used, the strength in HAZ becomes lower than that of the base material. In particular, the material strength becomes the lowest strength at the weld interface "J" and the 0.2% yield load in the vicinity of the weld interface "J" lowers to approximately 0.7 times (=1/1.4) the value of the base material. However, according to this embodiment, the cross-sectional area of the weld interface "J" is increased to be 1.4 times or more of the cross-sectional area of the end surfaces 11a or 21a in the uniform cross-section portions 11 or 21 before friction welded. As a result, the yield load in the vicinity of the weld interface "J" is more or less equal to that of the base material without receiving heat effects, while the yield load in the vicinity of the portion labeled "K", from which a pipe-wall thickness increases toward the weld interface "J", is lower than that of the weld interface. Therefore, not only for the case where the strength in the vicinity of the weld interface "J" is higher than that of the base material because of the heat effect of friction-welding, but also for the case where the strength in the vicinity of the weld interface "J" becomes lower than that of the base material, the vicinity of the weld interface "J" cannot be weakness of the part (i.e. the strength in the vicinity of the weld interface "J" cannot fall below a design criterion). In other words, according to the friction-welded part 1 of this embodiment, there is no need to determine the pipe-wall thickness around the uniform cross-section portions 11 and 21 based on the strength in the vicinity of the weld interface "J". Namely, the pipe-wall thickness around the uniform cross-section portions 11 and 21 can be determined based only on the strength in HAZ "H" excluding the vicinity of the weld interface "J". Then it is possible to avoid having the pipe-wall thickness around the uniform cross-section portions 11 and 21 which is designed to be larger than needed. In short, this embodiment enables weight reduction of the friction-welded part 1.

According to this embodiment, the length $L_2$ of the uniform cross-section portion 21 in the second member 20 before friction welded is equal to or less than the outer diameter of the uniform cross-section portion 21. This can reduce time and cost which are required for cutting and drilling work and the volume of an aluminum alloy material to be removed as an unnecessary burr during the work, preventing a material from being wasted.

It should be noted that it is not necessary to use an extrusion material for the first member 10 and the second member 20; a forging material, including a die-casting alloy material, is also allowed. For example, when using the first member 10 and the second member 20 made of a casting material to produce a suspension part, it is preferable to use the material, such as AC4C series alloy and DC3 series alloy.

EXAMPLE

1. Size of HAZ

Experiments were performed in order to investigate the size of HAZ "H" to be created during a friction-welding process using a first member 10 and a second member 20. The first member 10 and the second member 20 used for the friction-welding process were made of a well-tempered Al—Mg—Si series alloy (i.e. JIS standard 6061 aluminum alloy) which had undergone the T6 treatment (i.e. the alloy material having undergone a solution treatment, quenching and then artificial ageing), and formed of an extrusion material. Specifically, the first member 10 was produced by cutting a pipe-shaped extrusion material down to a predetermined size. The second member 20 was produced first by cutting the extrusion material down to a predetermined size, followed by cutting work. In this experiment, the uniform cross-section portion 11 in the first member 10 and the uniform cross-section portion 21 in the second member 20 had a cylindrical shape and the same sectional dimension. The lengths ($L_1$ and $L_2$) of the uniform cross-section portions 11 and 21, respectively, were kept equal to or longer than 10 mm.

TABLE 1 describes the specification on the uniform cross-section portions 11 and 21, the condition for friction welding and the size of the resultant HAZ "H" created in this experiment. If the Vickers hardness measured at any portion was equal to or smaller than 100 (Hv) in this experiment, the measured portion was determined to be in HAZ "H" affected by friction heat and have a strength lower than a predetermined critical strength the base material ought to have. The speed of the relative rotation "N" was 1,800 revolutions per minute during a friction process, while the friction pressure $P_1$ was 30 MPa and the upset pressure $P_2$ was 100 MPa for all the experiments listed in TABLE 1.

TABLE 1

| | Specification of uniform cross-section portions 11 and 21 | | Condition for friction welding | | | Size of HAZ "H" (mm) | |
|---|---|---|---|---|---|---|---|
| | Pipe-wall thickness "t" (mm) | Outer diameter (mm) | Friction upset length "x" (mm) | Forge upset length "y" (mm) | Total upset length "z" (mm) | Side of first member 10 | Side of second member 20 |
| No. 1-1 | 2.0 | 20 | 2.0 | 3.0 | 5.0 | 4.2 | 4.2 |
| No. 1-2 | 3.0 | 22 | 3.0 | 2.7 | 5.7 | 3.8 | 3.9 |
| No. 1-3 | 3.0 | 22 | 0.2 | 2.1 | 2.3 | 2.9 | 2.9 |
| No. 1-4 | 4.0 | 25 | 4.0 | 1.7 | 5.7 | 3.8 | 3.9 |
| No. 1-5 | 5.0 | 25 | 5.0 | 1.7 | 6.7 | 3.8 | 3.7 |
| No. 1-6 | 5.0 | 25 | 0.5 | 4.7 | 5.2 | 3.7 | 3.6 |

As shown in TABLE 1, the size of HAZ "H" was smaller than 5 mm, if the uniform cross-section portion 11 of the first member 10 and the uniform cross-section portion 21 of the second member 20 had a cylindrical shape and the same sectional dimension. In other words, provided that the lengths of uniform cross-section portions 11 and 21 after friction welded are kept 5 mm or longer, HAZ "H" is hardly enlarged up to any of the main portion 12 and the non-uniform cross-section portion 22. In all the experiments carried out, the total upset length "z" was greater than the pipe-wall thickness "t", except for the experiment of No. 1-3, a sufficient strength (55 kN or more) was obtained from the weld joint portion (the respective strength values were not given in TABLE 1). On the contrary, in this experiment of No. 1-3 where the total upset length "z" was smaller than the pipe-wall thickness (=3 mm), the strength at the weld joint portion was smaller (approximately 43 kN) than the other cases. The reason for this is that a volume of the discharged burr was so small that oxide films formed on the end surface 11a could not fully be removed with some oxide films left involved at the weld interface "J".

periphery surface and the inner periphery surface after friction welded. The first member 10 and the second member 20 used for a friction-welding process were made of a well-tempered Al—Mg—Si series alloy material (i.e. JIS standard 6061 aluminum alloy) which had undergone a T6 treatment (i.e. alloy having undergone solution treatment, quenching and then artificial ageing) and were formed of an extrusion material. Specifically, the first member 10 was produced by cutting a pipe-shaped extrusion material down to a predetermined size. The second member 20 was produced first by cutting an extrusion material down to a predetermined size, followed by cutting work. In all the experiments carried out, the uniform cross-section portions 11 and 21 had a cylindrical shape with a pipe-wall thickness of 3 mm, an inside diameter of 16 mm, and an outer diameter of 22 mm.

TABLE 2 describes the relationship between the upset pressure $P_2$ and the presence of a joint gap in the weld joint portion. Note that the letter "T" used in the TABLE means the time from when the relative rotation speed started to stop to when the upset pressure was applied.

TABLE 2

| | Conditions for friction welding | | | | Strength in the weld joint portion | Presence of a joint gap in the weld joint portion | | |
|---|---|---|---|---|---|---|---|---|
| | Speed of relative rotation "N" (revolutions/min.) | Friction pressure $P_1$ (MPa) | T (s) | Upset pressure $P_2$ (MPa) | | Outer periphery | Inner periphery | Result |
| No. 2-1 | 1800 | 30 | 0.4 | 25 | 22 | Yes | Yes | NG |
| No. 2-2 | 1800 | 30 | 0.4 | 50 | 58 | No | No | G |
| No. 2-3 | 1800 | 30 | 0.4 | 75 | 57 | No | No | G |
| No. 2-4 | 1800 | 30 | 0.4 | 100 | 64 | No | No | G |
| No. 2-5 | 1800 | 30 | 0.4 | 110 | 67 | No | No | G |
| No. 2-6 | 1800 | 30 | 0.4 | 125 | 66 | No | No | G |
| No. 2-7 | 1800 | 30 | 0.5 | 48 | 57 | Yes | Yes | NG |

2. Relationship Between Quality at the Weld Joint Portion and Conditions for Friction Welding Other experiments were performed in order to investigate effects on quality of the weld joint portion while changing a condition for friction welding. In the experiments carried out, quality of the weld joint portion was determined by inspecting the presence of a joint gap that can be created on the outer As is clear for the experiments of No. 2-2 to No. 2-6 in TABLE 2, no joint gap was observed at the weld joint portion and favorable quality of welded part was obtained, if the upset pressure $P_2$ was greater than the friction pressure $P_1$ and the upset pressure $P_2$ was equal to or larger than 50 MPa.

TABLE 3 describes a relationship between the presence of a joint gap and the time "T" which is from when the relative rotation started to stop to when the upset pressure $P_2$ was applied.

TABLE 3

| | Conditions for friction welding | | | | Strength in the weld joint portion | Presence of a joint gap in the weld joint portion | | Judge |
|---|---|---|---|---|---|---|---|---|
| | Speed of relative rotation "N" (revolutions/min.) | Friction pressure $P_1$ (MPa) | T (s) | Upset pressure $P_2$ (MPa) | | Outer periphery | Inner periphery | |
| No. 3-1 | 1800 | 15 | 0.30 | 50 | 55 | No | No | G |
| No. 3-2 | 1800 | 30 | 0.31 | 110 | 70 | No | No | G |
| No. 3-3 | 1800 | 30 | 0.40 | 110 | 67 | No | No | G |
| No. 3-4 | 1800 | 30 | 0.45 | 110 | 64 | No | No | G |
| No. 3-5 | 1800 | 30 | 0.50 | 110 | 63 | Yes | No | OK |
| No. 3-6 | 1800 | 15 | 0.50 | 110 | 66 | No | No | G |
| No. 3-7 | 1800 | 30 | 0.55 | 110 | 60 | Yes | Yes | NG |
| No. 3-8 | 1800 | 30 | 0.55 | 50 | 55 | Yes | Yes | NG |
| No. 3-9 | 1800 | 30 | 0.60 | 110 | 25 | Yes | Yes | NG |
| No. 3-10 | 1800 | 30 | 0.70 | 110 | 58 | Yes | Yes | NG |

As shown in TABLE 3, it was verified that no joint gap was created in the weld joint portion and that favorable quality of welded part was obtained regardless of the friction pressure $P_1$, if a time "T" was equal to or less than 0.45 seconds, (which was set at one of 15 MPa and 30 MPa in the experiment), where the time "T" denotes a period from when the relative rotation was started to stop to when the upset pressure $P_2$ was applied. In addition, no joint gap was created in the weld joint portion, if the friction pressure $P_1$ was set at 15 MPa (case No. 3-6), regardless of the time "T" which was set to 0.5 seconds, also where the time "T" denotes the period from when the relative rotation started to stop to when the upset pressure $P_2$ was applied. Additionally, no joint gap was created on the inner periphery surface, if the friction pressure $P_1$ was set to 30 MPa (case No. 3-5); therefore, it proves that comparatively favorable friction-welding was obtained with this experiment. It should be noted that any joint gap formed on the outer periphery surface in the weld joint portion can be reformed by removing a burr formed on the outer periphery surface in the weld joint portion (as shown in FIG. 2B). In short, friction-welding providing favorable quality can be obtained by applying the upset pressure $P_2$ within 0.50 seconds, or more preferably, within 0.45 seconds, from the time when the relative rotation of the first member 10 and the second member 20 starts to stop.

What is claimed is:

1. A method of friction-welding to join a first member and a second member together, the first member being made of an aluminum alloy material and having a uniform cross-section portion in a cylindrical shape with a pipe-wall thickness "t" ranging from 2 to 5 mm and a length equal to or more than (6 mm+t/2), and the second member being made of an aluminum alloy material and having a uniform cross-section portion in a cylindrical shape with the same cross-section as the first member and a length equal to or more than (6 mm+t/2), the method of friction-welding comprising the steps of:
   (a) a friction process of butting the uniform cross-section portion of the first member with the uniform cross-section portion of the second member and applying a friction pressure to the first and the second members while the first and the second members are rotating relatively to each other, and
   (b) an upset process of applying an upset pressure greater than the friction pressure,
   wherein a friction upset length is set to be a length within t to 2×t,
   wherein the pressure between the first and the second members rises to the upset pressure within 0.5 seconds after the relative rotation starts to stop, and
   wherein a portion corresponding to each of the uniform cross-section portions of the first member and the second member has a length as long as or longer than 5 mm after the friction-welding is finished.

2. The method of friction-welding according to claim 1, wherein the first and the second members are rotated relatively to each other while the relative rotation is kept at a constant speed equal to or more than 1,000 revolutions per minute, and the friction pressure is set to be a pressure within 15 Mpa to 40 Mpa, in the friction process.

3. The method of friction-welding according to claim 1, wherein the upset pressure is set to be a pressure within 50 Mpa to 200 Mpa, in the upset process.

4. The method of friction-welding according to claim 2, wherein the upset pressure is set to be a pressure within 50 Mpa to 200 Mpa, in the upset process.

5. The method of friction-welding according to claim 1, wherein the first member is a pipe-shaped and extruded metal member, and the second member is an end member formed by utilizing an extruded metal member, and wherein the uniform cross-section portion of the second member is formed by cutting a portion of the extruded metal member and has a cylindrical shape with a length of the uniform cross-section portion before the friction-welding is done, the length being equal to or less than the outer diameter of the uniform cross-section portion.

6. The method of friction-welding according to claim 2, wherein the first member is a pipe-shaped and extruded metal member, and the second member is an end member formed by utilizing an extruded metal member, and wherein the uniform cross-section portion of the second member is formed by cutting a portion of the extruded metal member and has a cylindrical shape with a length of the uniform cross-section portion before the friction-welding is done, the length being equal to or less than the outer diameter of the uniform cross-section portion.

7. The method of friction-welding according to claim 3, wherein the first member is a pipe-shaped and extruded metal member, and the second member is an end member formed by utilizing an extruded metal member, and wherein the uniform cross-section portion of the second member is formed by cutting a portion of the extruded metal member and has a cylindrical shape with a length of the uniform cross-section portion before the friction-welding is done, the length being equal to or less than the outer diameter of the uniform cross-section portion.

8. The method of friction-welding according to claim 4, wherein the first member is a pipe-shaped and extruded metal member, and the second member is an end member formed by utilizing an extruded metal member, and wherein the uniform cross-section portion of the second member is formed by cutting a portion of the extruded metal member and has a cylindrical shape with a length of the uniform cross-section portion before the friction-welding is done, the length being equal to or less than the outer diameter of the uniform cross-section portion.

\* \* \* \* \*